(12) United States Patent
Plantan

(10) Patent No.: US 9,409,267 B2
(45) Date of Patent: Aug. 9, 2016

(54) SNAP-IN CENTER SEAL BUSHING

(75) Inventor: Ronald S. Plantan, Mooresville, NC (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 654 days.

(21) Appl. No.: 12/817,951

(22) Filed: Jun. 17, 2010

(65) Prior Publication Data

US 2011/0311170 A1    Dec. 22, 2011

(51) Int. Cl.
| B23P 19/10 | (2006.01) |
| F16J 15/32 | (2016.01) |
| B23P 19/08 | (2006.01) |
| F16D 125/00 | (2012.01) |

(52) U.S. Cl.
CPC ........... *B23P 19/084* (2013.01); *F16J 15/3268* (2013.01); *F16D 2125/00* (2013.01); *Y10T 29/49947* (2015.01)

(58) Field of Classification Search
CPC ..... B62D 3/12; F16H 2055/281; F16C 29/02; F16C 29/002; B23P 19/084; F16J 15/3268
USPC ......... 384/16, 15, 37–39, 41, 215, 26, 29, 32, 384/42, 222, 275, 276, 295, 296, 428; 277/551, 609, 616, 577; 188/322.16, 188/322.17; 92/165 R, 168, 63, 64; 267/158–161, 163
See application file for complete search history.

(56) References Cited

U.S. PATENT DOCUMENTS

| 2,549,818 | A | * | 4/1951 | Joy ................................ 92/168 |
| 3,071,800 | A | * | 1/1963 | Patriquin ........................ 277/585 |
| 3,136,230 | A | * | 6/1964 | Buckley .......................... 384/16 |
| 3,333,513 | A | * | 8/1967 | Wettstein ..................... 92/165 R |
| 4,185,721 | A | | 1/1980 | Karklins et al. |
| 4,324,438 | A | * | 4/1982 | Lister ............................... 384/16 |
| 5,181,581 | A | * | 1/1993 | Engler ............................. 384/16 |
| 5,272,933 | A | | 12/1993 | Collier et al. |

(Continued)

FOREIGN PATENT DOCUMENTS

| CN | 1136344 A | 11/1996 |
| DE | 43 09 304 A1 | 9/1993 |

(Continued)

OTHER PUBLICATIONS

EPO Translation of the Description of WO 2009106254 A1, Eck et al., Sep. 3, 2009.*

(Continued)

*Primary Examiner* — Daniel Yabut

(74) *Attorney, Agent, or Firm* — Crowell & Moring LLP

(57) ABSTRACT

A bushing adapted to secure an O-ring seal in position relative to an area of a passage permitting reciprocation of a push rod forms a generally circular bushing body with opposed end faces. The end faces are separated by a gap so as to provide the bushing with an approximately C-shaped structure. The bushing includes a plurality of locking elements resistant to axial loads imposed on the bushing by the push rod disposed at least substantially within a corresponding plurality of recesses distributed around a circumferential exterior of the bushing. Solid ribs are interspersed with the locking fingers to resist radial loads imposed on the bushing by the push rod during operation. The O-ring seal is secured in position within the passage area of the passage by an end surface of the bushing.

11 Claims, 2 Drawing Sheets

(56) References Cited

U.S. PATENT DOCUMENTS

| | | | |
|---|---|---|---|
| 5,531,524 A * | 7/1996 | Brouwer | 384/220 |
| 5,611,628 A | 3/1997 | Brouwer | |
| 5,709,283 A | 1/1998 | Nief | |
| 5,829,339 A | 11/1998 | Smith | |
| 6,422,569 B1 * | 7/2002 | Comes et al. | 277/437 |
| 6,485,180 B2 * | 11/2002 | Mena | 384/38 |
| 6,729,224 B1 | 5/2004 | Roy | |
| 6,808,181 B1 * | 10/2004 | Shemtov | 277/609 |
| 7,056,027 B2 * | 6/2006 | Puckett | 384/215 |
| 7,220,056 B2 * | 5/2007 | Kubota et al. | 384/215 |
| 7,665,747 B2 * | 2/2010 | Arlt | 384/215 |
| 7,798,504 B2 * | 9/2010 | Hirose et al. | 384/220 |
| 8,272,785 B2 * | 9/2012 | Hirose et al. | 384/215 |
| 8,429,991 B2 * | 4/2013 | Kim et al. | 384/37 |
| 2007/0034465 A1 | 2/2007 | Thompson et al. | |
| 2009/0000853 A1 * | 1/2009 | Hirose et al. | 384/42 |
| 2010/0320699 A1 * | 12/2010 | Takeda et al. | 277/612 |

FOREIGN PATENT DOCUMENTS

| | | | | |
|---|---|---|---|---|
| WO | WO 2009/106254 A1 | 9/2009 | | |
| WO | WO 2009106254 A1 * | 9/2009 | | F16J 15/3252 |

OTHER PUBLICATIONS

PCT/ISA/237 Form (Four (4) pages).
International Search Report dated Oct. 24, 2011 (Three (3) pages).
Chinese Office Action dated May 27, 2014, with English translation, (Thirteen (13) pages).
Second Chinese Office Action dated Jan. 14, 2015, with English Translation (six (6) pages).

* cited by examiner

SNAP-IN CENTER SEAL BUSHING

BACKGROUND OF THE INVENTION

1. Field of the Invention

A conventionally configured snap-in bushing used to retain a center seal O-ring in proper location has a circular, ring-like configuration. Upon insertion of such a conventionally configured bushing into position, enabling it to both support a brake actuator push rod or the like and retain the O-ring seal, radial fingers on the bushing snap into a groove in an adapter base to secure the bushing, and the seal retained by the bushing, in place. Effectiveness of the bushing in guiding and minimizing tilting of the push rod throughout its stroke is compromised, however, since the fingers have to be flexible enough to permit insertion of the bushing into a seal opening in the adapter base. Parking spring breakage, to which incomplete bushing insertion can contribute, is the most common reason for spring brake failure.

2. Description of Related Art

U.S. Patent Application Publication 2007/0034465 to Thompson et al. discloses a bushing assembly for an actuator center seal with at least six flexible tabs. The tabs flex to absorb side loading while maintaining a bushing position within the actuator assembly.

U.S. Pat. No. 5,272,933 to Collier et al. shows a damping ring for a rack and pinion steering gear. Flexible inner fingers of the damping ring resist transfer of vibration to the steering wheel.

U.S. Pat. No. 5,709,283 to Nief discloses a rack and pinion power steering gear with a seal retainer. The seal retainer includes a flexible portion to hold the seal against an inner portion of the shaft, but lacks solid portions to absorb side loading.

U.S. Pat. No. 5,829,339 to Smith shows a sealed bushing assembly for a brake actuator. A thermoplastic bushing is placed in a sleeve secured to a steel adaptor base. The sleeve retains the bushing, and the sealed bushing maintains the seal between the actuator chambers.

SUMMARY OF THE INVENTION

The present invention concerns a new bushing design intended to address two issues arising in connection with current snap-in center seal bushing configurations. The new design both improves guidance of the internal push rod and reduces insertion and fatigue stresses on snap-in locking fingers. The new bushing also operates to prevent insertion of the internal push rod if teeth on the locking fingers are not fully inserted in a receiving groove or recess.

Generally, the new bushing has a split ring design, with a plurality of radial ribs that extend out to the full diameter of the adapter base bore. These ribs are located between the locking fingers for improved guidance of the push rod. The improved push rod guidance keeps the parking spring better aligned during cycling. This, in turn, reduces stresses in the spring that can be introduced by lateral movement during stroking, minimizes rubbing between the power spring coils and the spring housing, and reduces inter-coil contact.

Because of the split ring design, an inner diameter of the bushing, during installation or insertion, is smaller than that inner diameter after full installation. This smaller diameter prevents insertion of the push rod if the locking tabs are not fully inserted. Because the split ring design permits a reduced overall bushing diameter during insertion, moreover, the locking fingers do not have to flex as much during insertion, reducing stress on the fingers. Once installed, the radial loads imposed on the bushing from the parking spring are resisted by ribs interposed between adjacent locking fingers. This eliminates radial stresses on the locking fingers during operation of the parking brake, and improves the fatigue life of the locking fingers for more secure retention of the bushing throughout the bushing lifetime.

After the bushing is installed, the fingers prevent the bushing from moving longitudinally, while the solid portions of the bushing, i.e. the ribs, absorb side loading during axial push rod motion. Sealing is provided by the seal per se that is retained in position by the properly positioned bushing; the bushing of the present invention does not maintain a seal, but instead absorbs side loading while being restrained from longitudinal motion by the flexible locking fingers. The present invention thus is distinguished from prior seal retention arrangements by the combined features of flexible fingers, which maintain the bushing in longitudinal position, and the ribs or similar solid portions, which absorb side loading.

In particular arrangements according to the invention, a bushing adapted to secure an O-ring seal in position within an area of a passage permitting reciprocation of a push rod forms a generally circular bushing body with opposed end faces. The end faces are separated by a gap so as to provide the bushing with an approximately C-shaped structure. The bushing includes a plurality of locking elements resistant to axial loads imposed on the bushing by the push rod disposed at least substantially within a corresponding plurality of recesses distributed around a circumferential exterior of the bushing. Solid ribs are interspersed with the locking fingers to resist radial loads imposed on the bushing by the push rod during operation. The O-ring seal is secured in position within the passage area of the passage by an end surface of the bushing.

Each of the locking elements includes a protruding tooth to snap into a groove or recess in an adapter and secure the bushing axially relative to the adapter. A smooth central wall of the bushing defines an inner diameter that changes during installation of the bushing in the adapter, with the inner diameter decreasing prior to complete installation of the bushing in the adapter and increasing upon complete installation of the bushing. In this manner, insertion of the push rod through the bushing is permitted only upon complete installation of the bushing.

Each of the locking elements has an inclined exterior surface for cooperating with the adapter to displace the locking elements during installation of the bushing in the adapter.

Also disclosed are a seal assembly including an O-ring seal and the bushing mentioned, and a process of securing an O-ring seal in position within an area of a passage through which a push rod is to reciprocate.

DETAILED DESCRIPTION OF THE INVENTION

Figure 1:
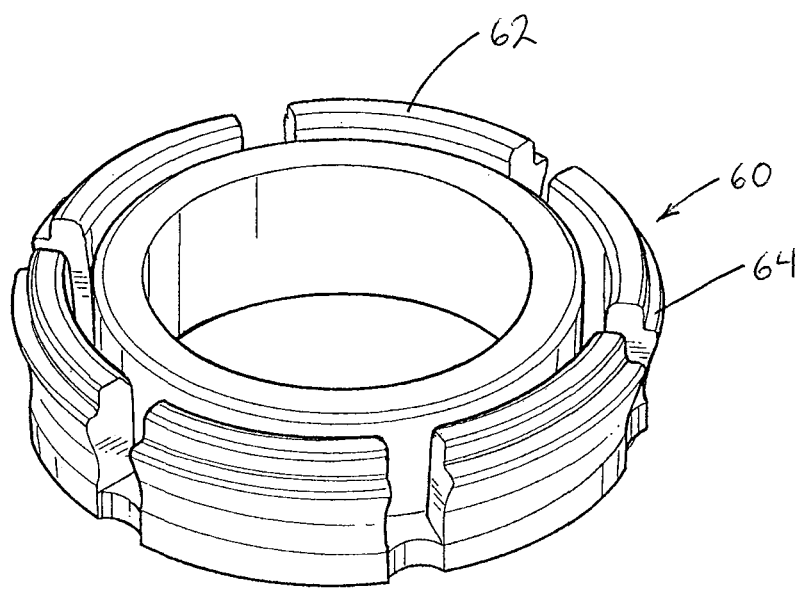
FIG. 1 is a perspective view, from above, of a conventional snap-in bushing used to retain a center seal O-ring.

FIG. 1 illustrates the configuration of a snap-in bushing 60 now in use. This conventional snap-in bushing is used to retain a center seal O-ring intended to seal against an outer surface of a reciprocating actuator push rod. The bushing 60 is configured as a circular element, and radial fingers 62 are provided with locking teeth 64 to snap into a groove in an adapter base to secure the bushing 60 in position against the O-ring seal. Because the fingers 62 have to be flexible enough for insertion into an opening for the push rod, the effectiveness of the fingers in guiding the push rod with minimized tilting throughout its stroke is reduced. The bushing 60 illustrated in FIG. 1 has a configuration described in more detail by U.S. Patent Application Publication 2007/0034465 to Thompson et al. mentioned above. The entire disclosure of the Thompson et al. ('465) publication is expressly incorporated herein by reference as non-essential subject matter.

Figure 2:
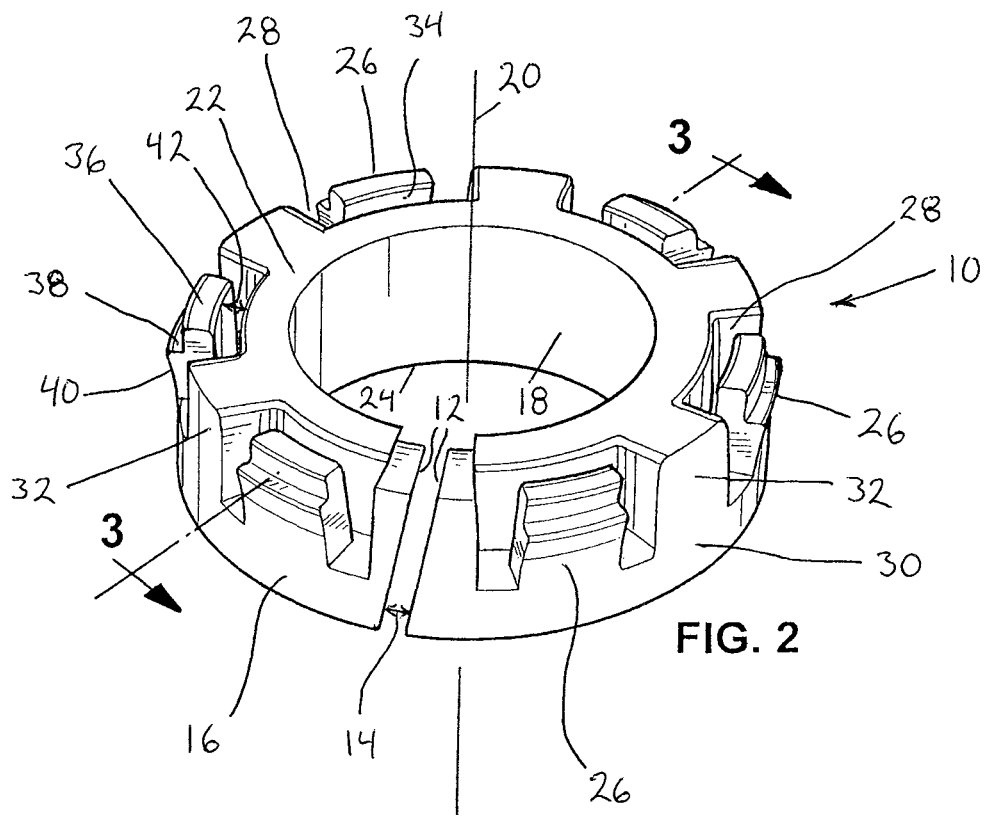
FIG. 2 is a perspective view, from above, of a split ring snap-in bushing used to retain a center seal O-ring according to the present invention.

The split ring snap-in bushing 10 shown in FIG. 2 is defined by a generally ring-shaped bushing body 16 having opposed end faces 12 separated by a gap or slit 14. Viewed from above, the bushing 10 defines an approximately "C" shaped structure overall.

The bushing 10 is generally cylindrical in form, and includes a smooth central wall 18 surrounding a longitudinally extending central axis 20 of the bushing. The wall 18 defines the inner surface of a passage through which a push rod (not shown) may pass and reciprocate in the direction of the axis 20. The bushing 10 also has opposite, substantially parallel, flat end surfaces 22 and 24. As FIG. 2 illustrates, these end surfaces 22 and 24 are spaced from one another in the direction of the central bushing axis 20.

A number of locking fingers, tabs, or similar elements 26 (referred to below as locking fingers) are disposed at least substantially within a corresponding number of recesses 28, which are distributed around the circumferential exterior 30 of the split ring snap-in bushing 10. As illustrated in FIG. 2, six recesses 28, with each recess 28 having one of six corresponding locking fingers 26 substantially disposed therein, are distributed around the circumferential bushing exterior 30.

As will become apparent, when the split ring snap-in bushing 10 is in normal use, the locking fingers 26 preferably do not bend. Due to the presence of the recesses 28, the bushing includes solid ribs 32 interspersed with the locking fingers 26 to partially absorb loads that otherwise could fully be transmitted to the locking fingers 26 by tilting of the push rod during operation of the parking brake. The solid ribs 32 thus serve to minimize radial stresses on the locking fingers or tabs 26.

Each locking finger 26 includes a radially interior surface 34, an end surface 36, a stepped radially outer surface defining a locking tooth 38, and an inclined radially exterior surface 40. The inclined exterior surfaces 40 of the fingers 26 cooperate in a manner to be described with an adapter base or other element (not shown in FIG. 2) to displace the locking finger radially inwardly until the teeth 38 snap into an adapter base groove or recess as the snap-in bushing 10 is inserted into the adapter base for seal retention. A gap 42, defined between the radially interior surface 34 of each locking finger 26 and a corresponding surface of the recess facing the radially interior surface 34, permits displacement of the locking fingers 26 in the manner described.

Figure 3:
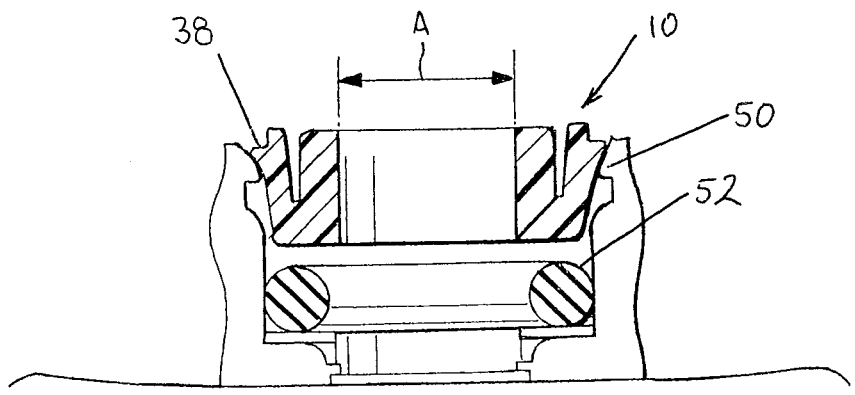
FIG. 3 is a sectional view of the snap-in bushing of FIG. 2 along line 3-3 as the bushing is being inserted axially into a guiding and sealing area of a passage through which a push rod can reciprocate.
Figure 4:
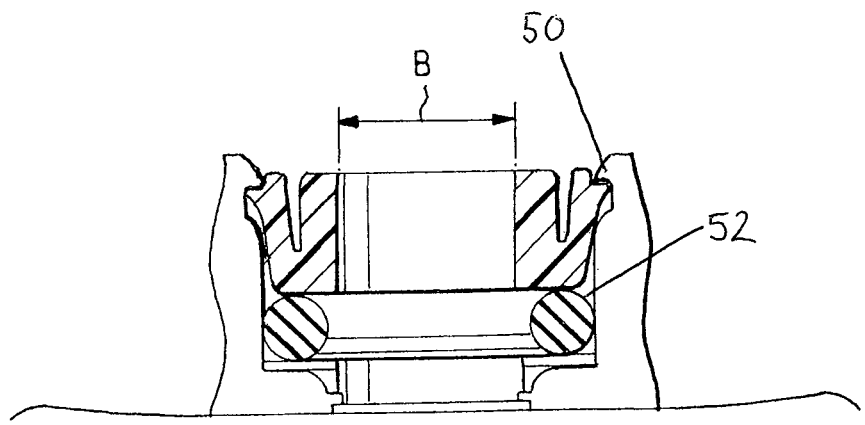
FIG. 4 is a sectional view of the snap-in bushing of FIG. 2 after it is fully inserted into the guiding and sealing area of the passage shown in FIG. 3.

Reference is now made to FIGS. 3 and 4, which illustrate installation of the split ring snap-in bushing 10 into the guiding and sealing area of a passage that, in the present embodiment, is for reciprocation of a push rod of an air brake actuator. The present invention, of course, should not be considered as limited to such an application. FIG. 3 illustrates the structure of the bushing as it is being pressed into the passage or bore of an adapter, e.g. by an appropriate tool (not shown). At least one camming protrusion 50 in the bore cooperates with the inclined radially exterior surfaces 40 of the locking fingers 26 to displace the fingers radially inwardly. The presence of the gaps 42 permits displacement of the locking fingers 26 in such a way. As the bushing 10 is pressed further into the passage, the locking teeth 38 snap into position below the camming protrusions 50 to lock the bushing 10 in position, as shown in FIG. 4, so that the bushing 10 applies appropriate pressure on an O-ring seal 52. In contrast to the conventional snap-in bushing illustrated in FIG. 1, the split ring design of the bushing 10 of the present invention permits the inner diameter A of the bushing 10, during installation or insertion, to be smaller, for example by about 8%, than the inner diameter B of the bushing upon full installation. This smaller diameter prevents insertion of the actuator push rod if the locking teeth 38 are not fully inserted into position below the protrusion or protrusions 50, as is the case in the condition shown in FIG. 3, for example. Another advantage is that, because the overall bushing diameter is smaller during insertion, the locking fingers 26 do not have to flex as much during insertion, reducing stress on these fingers.

Once the bushing 10 is installed, radial loads imposed on the bushing from the parking spring are resisted by the ribs 32. This eliminates radial stresses on the locking fingers 26 during operation of the parking brake, which improves the fatigue life of the locking fingers for more secure retention of the bushing throughout the bushing lifetime.

The present invention thus generally concerns a snap-in center seal arrangement for guiding an internal push rod. The seal arrangement includes a bushing that prevents insertion of the push rod before the locking fingers of the bushing are fully inserted. The locking fingers do not bend during normal use, since the bushing is provided with ribs, defining solid portions interspersed with the locking fingers, to absorb lateral loads applied by the push rod. The bushing also prevents the spring coil from touching the actuator housing, which may happen if the spring is not correctly centered. The split ring design accounts for tolerances during temperature swings. No sealing is done by the bushing itself, as sealing between actuator chambers, again, is performed by the O-ring and kept below the bushing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A bushing adapted to secure an O-ring seal in position relative to a passage, the bushing forming a generally circular bushing body with opposed end faces separated by a gap so as to provide the bushing with an approximately C-shaped structure, the bushing comprising:

a plurality of locking elements resistant to axial loads imposed on the bushing disposed at least substantially within a corresponding plurality of recesses in a circumferential exterior of the bushing that are distributed around the circumferential exterior of the bushing, and a plurality of solid ribs interspersed with the locking elements to resist radial loads imposed on the bushing, the solid ribs defining a radially outer surface of said circumferential exterior of the bushing, wherein each of the locking elements also defines said radially outer surface of said circumferential exterior of the bushing, as well as a radially interior surface oriented toward one of a plurality of radially outwardly facing walls, a step, defining a locking tooth on the radially outer surface of said circumferential exterior of the bushing, a locking element end surface extending between the radially interior surface and the step, and an inclined radially exterior surface extending away from the step and additionally forming part of the circumferential exterior of the bushing, wherein each of the recesses is formed by one of the plurality of radially outwardly facing walls and side surfaces of adjacent ribs of said plurality of solid ribs that extend substantially radially from the one of the radially outwardly facing walls, wherein each said radially interior surface is located within one of the recesses and at least partly between the side surfaces of adjacent ribs of said plurality of solid ribs, wherein each locking tooth projects radially with respect to the bushing beyond outer surfaces of a pair of the solid ribs adjacent to the locking tooth, and wherein each of the solid ribs defines an axial length, and each locking tooth is disposed within said axial length.

2. The bushing according to claim 1, wherein the bushing includes six of said locking elements.

3. A seal assembly comprising:

an O-ring seal, and the bushing according to claim 1 to secure the O-ring seal in position within said adapter.

4. The seal assembly according to claim 3, wherein the O-ring seal is secured in position within said adapter by a bushing end surface.

5. The bushing according to claim 1, wherein each locking tooth protrudes so as to snap into a groove or recess in an adapter defining the passage and secure the bushing axially relative to the adapter.

6. The bushing according to claim 5, including a smooth central wall defining an inner diameter that changes during installation of the bushing in the adapter.

7. The bushing according to claim 6, wherein the inner diameter increases upon complete installation of the bushing in the adapter.

8. The bushing according to claim 6, wherein each of the inclined radially exterior surfaces cooperates with the adapter to displace the locking elements during installation of the bushing in the adapter.

9. The bushing according to claim 6, wherein the inner diameter of the smooth central wall changes about 8% during installation.

10. The bushing according to claim 6, wherein the inner diameter decreases prior to complete installation of the bushing in the adapter and increases upon complete installation of the bushing in the adapter.

11. The bushing according to claim 10, wherein the inner diameter of the smooth central wall changes about 8% during installation.

* * * * *